Oct. 4, 1927.

F. E. KARG 1,644,595

HEATING DEVICE

Filed Dec. 17, 1926

INVENTOR.
Frank E. Karg,
BY Geo. P. Kimmel
ATTORNEY.

Oct. 4, 1927. 1,644,595
F. E. KARG
HEATING DEVICE
Filed Dec. 17, 1926  2 Sheets-Sheet 2

INVENTOR.
Frank E. Karg,
BY
Geo. P. Kimmel
ATTORNEY.

Patented Oct. 4, 1927.

1,644,595

UNITED STATES PATENT OFFICE.

FRANK E. KARG, OF CLEVELAND, OHIO.

HEATING DEVICE.

Application filed December 17, 1926. Serial No. 155,504.

This invention relates to a heating device, more particularly to that class of heating devices which are electrically operated and employed for increasing the temperature of a room in which the device is used by the discharge therein of hot air currents, and the invention has for its object to provide, in a manner as hereinafter set forth, a heater of such class including an air heating chamber opening at the front of the device for discharging hot air in a room to increase the temperature thereof and further with the device including means for circulating a forced draft of air exteriorly of the walls of the heating chamber for the purpose of preheating the air prior to the entrance of the forced draft of air into the heating chamber, under such conditions expeditiously providing for the heating of the air to be employed for increasing the temperature of the room in which the device is employed.

Further objects of the invention are to provide, in a manner as hereinafter set forth, a heating device of the class referred to, which is simple in its construction and arrangement, strong, portable, durable, compact, thoroughly efficient in its use, electrically operated, readily assembled, and comparatively inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
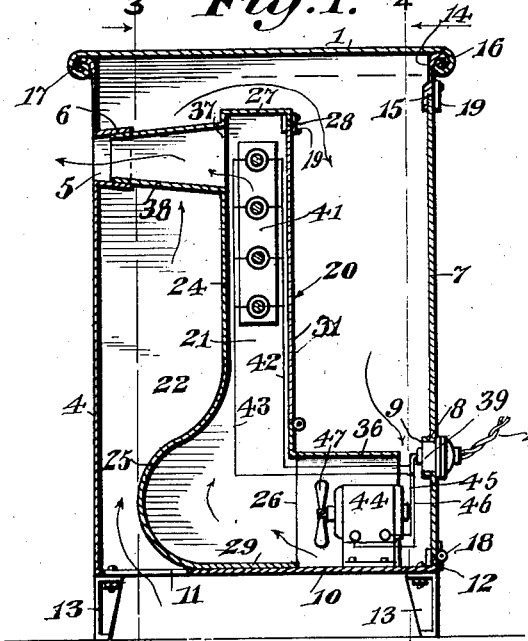
Figure 1 is a vertical sectional view of a heating device in accordance with this invention.
Figure 2:
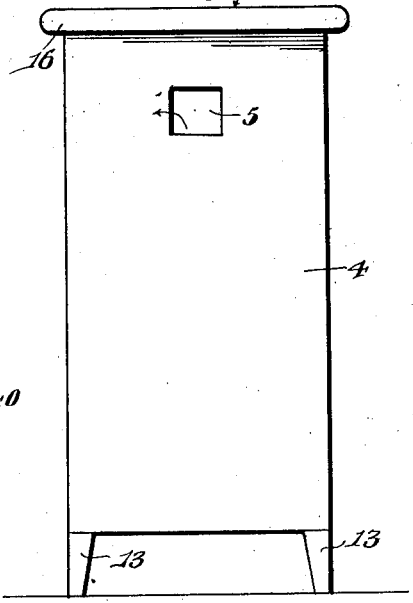
Figure 2 is a front elevation thereof.
Figure 3:
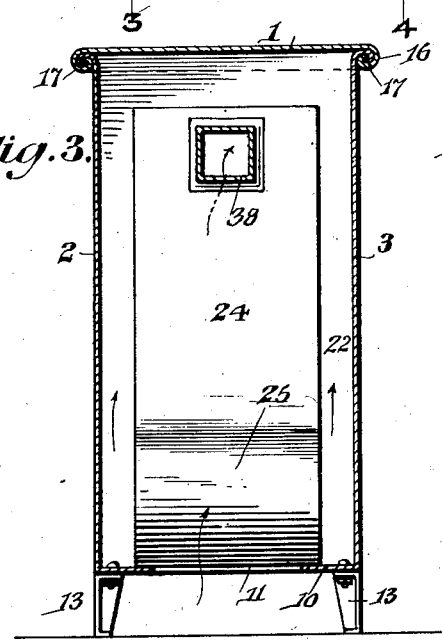
Figure 3 is a section on line 3—3 Figure 1.
Figure 4:
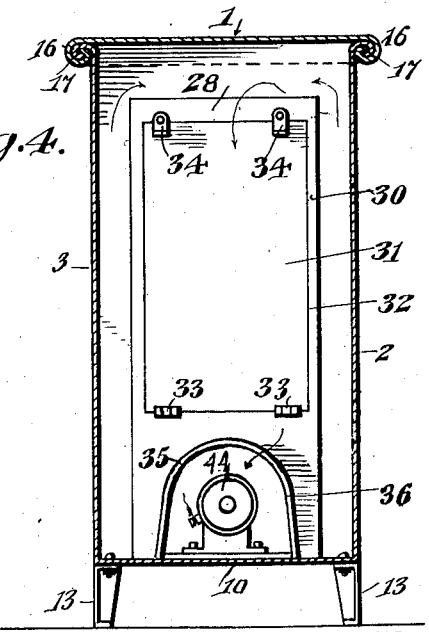
Figure 4 is a section on line 4—4 Figure 1.
Figure 5:
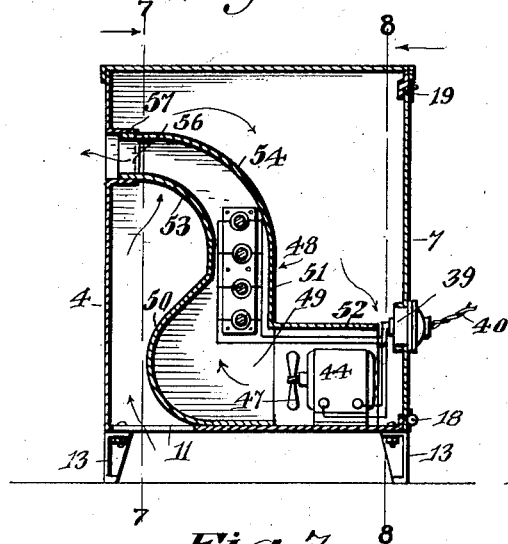
Figure 5 is a vertical sectional view of a modified form of heating device in accordance with this invention.
Figure 6:
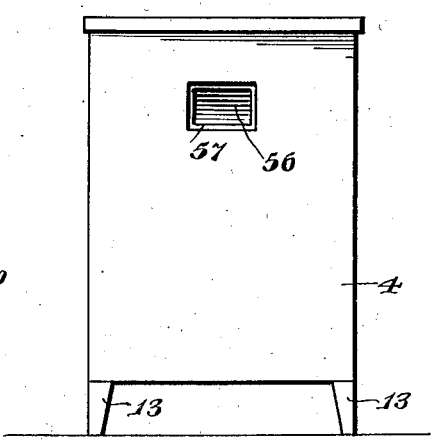
Figure 6 is a front elevation thereof.
Figure 7:
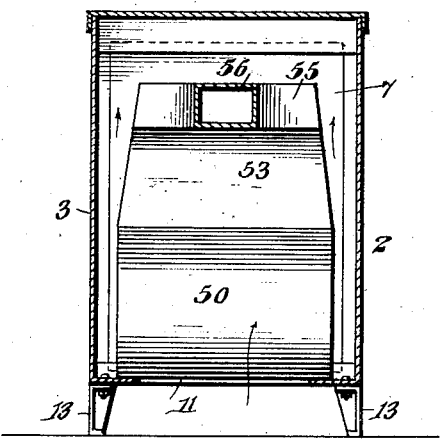
Figure 7 is a section on line 7—7 Figure 5.
Figure 8:
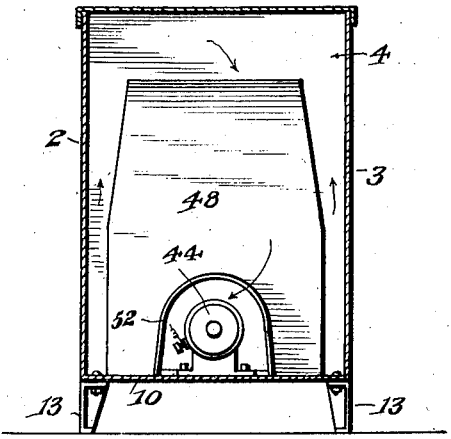
Figure 8 is a section on line 8—8 Figure 5.
Figure 10:
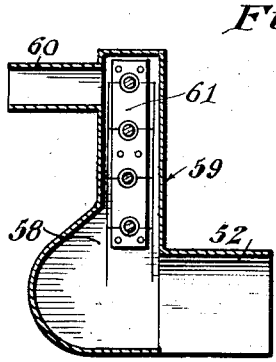

Figure 10 a vertical sectional view of a modified form of heating chamber.

Referring to Figures 1 to 4 of the drawings the heating device comprises a housing including a closed top 1, a pair of side walls 2, 3, a front wall 4 provided near its top with an opening 5 and an inwardly extending flaring collar 6 integral with the body of the wall 4, a hinged rear wall 7 formed in its lower portion with an opening 8 and an inwardly extending collar 9 which registers with the opening 8, and a bottom 10 formed at its front with an intake opening 11 for cool air and having its rear provided with an upstanding flange 12. Secured to the bottom 10 is a series of supporting legs 13. The rear of the top 1 has depending therefrom a wall strip 14 having the lower part thereof inset as at 15. The top 1 and wall strip 14 are bent in a manner to interengage each other to provide a securing joint 16 therebetween. The top 1, front wall 4 and side walls 2, 3 at their upper ends are bent to interengage with each other as at 17 to provide a securing joint therebetween. Preferably the side walls 2, 3, front wall 4 and bottom 10 are formed from a single piece of sheet metal. The rear wall 7 is hinged to the flange 12, as at 18, and its upper end abuts against the inset lower part 15 of the wall forming strip 14 and the latter is provided with a latch 19 which overlaps the rear wall 7, for the purpose of detachably securing it in closed position.

Arranged within the housing is a vertically disposed casing, referred to generally by the reference character 20 which forms an air heating chamber 21. The casing 20, in connection with the housing, provides a cool air intake chamber 22 which surrounds the casing 20, and the latter is of less height and of less width than the height and width of the housing. The casing 20 includes a front wall formed with a vertically disposed upper portion 24 and a forwardly extended bulged lower portion 25 which is curvilinear in vertical section. The casing 20 further includes a pair of side walls 26, a top wall 27 provided with a depending flange 28 at its rear, and a bottom 29, a back wall 30 having a hinged door 31. The upper end of the wall 30 is formed integral with the flange 28, and said wall 30 is cut-out as at 32 to provide an opening in which seats the door 31. The door 31 is hinged to the wall 30, as at 33, The door 31 provides means whereby access can be had to the chamber 21. The flange 28 is provided with depending, pivoted latches 34 which overlap the door 31 for detachably securing it in closed position. The wall 30 is formed at its lower end with a cut-out portion 35 which registers with a rearwardly extending inverted U-shaped extension 36 which seats upon the bottom 10. The bottom 29 of the casing 20 is mounted, as well as secured in any suitable manner to the bottom 10 of the housing. The bulged lower portion 25 of the front wall projects over the intake opening 11 formed in the bottom 10, see Figure 1. The upper part 24, of the front wall, in proximity to the upper end thereof is formed with an opening 37 for the outlet of the heated air from the chamber 21, and formed integral with the upper part 24 of the wall, is a forwardly extending tapered spout 38 which extends into, as well as opens into the collar or sleeve 6.

Mounted in the opening 8 is a plug 39 for the leading-in wires 40 which extend from a suitable source of electrical energy. Positioned within the chamber 21, near the upper end thereof, is an electrically operated heating unit 41, and the circuit connections 42, 43 thereof lead to the plug 39. Supported upon the bottom 10 and arranged within the extension 36 is an electric motor 44, the circuit connections of which are indicated at 45, 46 and which lead to the plug 39. Operated by the motor 44 is a fan 47 for producing a forced draft. The extension 36 does not project to the rear wall 7 of the housing and said extension 36 provides for the air to be conducted through the opening 35 into the enlarged lower part of the chamber 21.

The air entering at the opening 11 will circulate around the chamber 21, and be drawn by the fan into the extension 36, and from there discharge into the enlarged lower portion of the chamber 21 and be acted upon by the heating unit 41, whereby the temperature of the air will be increased and from the chamber 21 the air will be discharged out through the nose or spout 38 at the front of the heater.

The form shown in Figures 5 to 10 is the same as that referred to in connection with Figures 1 to 4, but with this exception, that the casings which provide the air heating chambers are of a different form from that of the casing 20. With respect to Figures 5, 6, 7 and 8, the casing which provides the air heating chamber, is referred to generally by the reference character 48 and includes a pair of side walls 49, a front wall 50, a rear wall 51 and an extension 52, which projects rearwardly from the wall 51 and is of the same form as the extension 36 and employed for the same purpose. The front wall 50 has a bulged lower portion and an upstanding and forwardly curved upper portion 53 which is tapered. The rear wall 51 includes a vertically disposed lower portion and an upstanding and forwardly curved upper portion 54 which opposes the portion 53 of the front wall 50 and is tapered. The side walls 49 incline towards each other as indicated at 55, and owing to the manner of setting up the upper portions of the walls 50, 51 and the inclining of the upper parts of the side walls 49, a discharge spout or nozzle 56 is formed and which extends in and opens into the collar or sleeve 57 which corresponds to the collar or sleeve 6 shown in Figure 1. The back wall 51 is not provided with a hinged section 31 as the back wall of the casing 20. Otherwise than that as stated the construction shown in Figures 5, 6, 7 and 8 is the same as that illustrated in connection with Figures 1 to 4.

Figure 9:
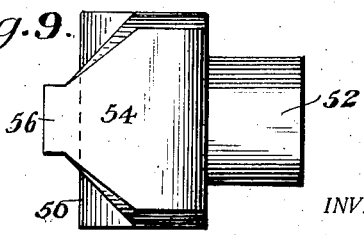
Figure 9 is a top plan view.

In Figure 9 the casing 48 is shown in top plan so that the tapered formation of the walls thereof as well as the inclination of the side walls can be readily seen.

Referring to Figure 10 the casing which provides the air heating chamber 58, is referred to generally by the reference character 59, and it is constructed somewhat similar to the casing 20, but with this exception that the discharge spout or nozzle 60 is not of tapered form, as is the discharge spout or nozzle as shown in connection with the casing 20. In Figure 10, the electrical heating element 61, extends to a point in close proximity to the top wall of the casing 59 and also extends into the enlarged lower or bulged portion of the chamber 58. The rear wall of the casing 59, shown in Figure 10 is not provided with a hinged section, as is the casing 20. Otherwise than that as stated the casing 59 is substantially similar in construction to the casing 20.

It is thought the many advantages of a heating device, in accordance with this invention can be readily understood, and although the preferred embodiment of the invention is as illustrated and described, yet it is to be understood that changes in the details of construction can be had which will fall within the scope of the invention as claimed.

What I claim is:

1. An air heating device comprising a housing having its bottom forwardly thereof provided with a cold air inlet opening and its front in proximity to its upper end with a hot air outlet, and a casing arranged within the housing, having an electrical heating element therein and providing a heating chamber for air, said chamber discharging into said outlet, said casing in connection with said housing forming a cool air receiving chamber surrounding said casing, said casing, above the bottom of said housing, having its rear provided with an intake communicating with said air heating chamber at the lower portion of the rear thereof.

2. An air heating device constructed in accordance with claim 1, an extension projecting rearwardly from said intake, and electrically operating means arranged within said extension for producing a forced draft through said chambers.

3. An air heating device constructed in accordance with claim 1, said air heating chamber having the lower portion thereof bulging towards the front of the housing.

4. An air heating device constructed in accordance with claim 1, said heating chamber having the lower part thereof bulging forwardly towards the front of the housing and extending over said inlet opening.

5. An air heating device comprising a housing having its bottom forwardly thereof provided with a cool air inlet opening and its front formed with a hot air outlet, a casing arranged within and of less height, width and breadth than that of the housing and further supported upon the bottom of the latter, said casing forming an air heating chamber and including a nozzle discharging in said outlet and further including an electrical heating element positioned in the upper portion of said chamber, said casing in connection with said housing forming a cool air receiving chamber surrounding the front, top, side and rear of said casing, and said casing having an intake at its lower end communicating with said air-receiving chamber at the rear of the lower portion of the latter.

6. An air heating device constructed in accordance with claim 5, said air heating chamber having the lower portion thereof bulging towards the front of the housing and extending over said inlet opening.

7. An air heating device constructed in accordance with claim 5, an extension connected with said casing and projecting rearwardly from said intake, and electrically operated means surrounded by said extension for producing a forced draft through said chambers, said extension providing means for directing the pre-heated air to said intake.

8. In a heating device a heating chamber having a reduced upper portion, a forwardly bulged enlarged lower portion and a forwardly directed discharge nozzle at its upper end, said chamber further including an intake at the rear of said enlarged lower portion and an electrical heating unit arranged within the reduced upper portion of said chamber.

9. A heating device constructed in accordance with claim 8, an extension projecting rearwardly from said intake for directing in-coming air to the chamber, and means mounted in said extension to provide for a forced draft through said chamber.

In testimony whereof, I affix my signature hereto.

FRANK E. KARG.